United States Patent
Wu et al.

(10) Patent No.: US 8,068,966 B2
(45) Date of Patent: Nov. 29, 2011

(54) METHOD FOR MONITORING AN AUXILIARY PUMP FOR A HYBRID POWERTRAIN

(75) Inventors: Peter E. Wu, Brighton, MI (US); Ali K Naqvi, White Lake, MI (US); Rebecca Trierweiler, White Lake, MI (US); Syed Naqi, Ann Arbor, MI (US); Ryan D Martini, Royal Oak, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 653 days.

(21) Appl. No.: 12/249,563

(22) Filed: Oct. 10, 2008

(65) Prior Publication Data
US 2009/0118954 A1 May 7, 2009

Related U.S. Application Data

(60) Provisional application No. 60/985,219, filed on Nov. 3, 2007.

(51) Int. Cl.
*G06F 17/00* (2006.01)
(52) U.S. Cl. .......... 701/60; 701/51; 701/61
(58) Field of Classification Search .......... 701/51, 701/60–61
See application file for complete search history.

(56) References Cited

U.S. PATENT DOCUMENTS

| | | | |
|---|---|---|---|
| 6,656,083 B2 * | 12/2003 | Esaki | 477/5 |
| 6,692,402 B2 * | 2/2004 | Nakamori et al. | 477/3 |
| 6,705,416 B1 * | 3/2004 | Glonner et al. | 180/65.23 |
| 6,805,647 B2 * | 10/2004 | Silveri et al. | 475/4 |
| 6,832,148 B1 | 12/2004 | Bennett | |
| 6,868,318 B1 | 3/2005 | Cawthorne | |
| 6,874,993 B2 * | 4/2005 | Stragapede | 417/44.11 |
| 7,154,236 B1 | 12/2006 | Heap | |
| 7,316,283 B2 * | 1/2008 | Yamamoto et al. | 180/65.235 |
| 7,465,250 B2 * | 12/2008 | Tamai et al. | 477/3 |
| 7,467,678 B2 * | 12/2008 | Tanaka et al. | 180/65.265 |
| 7,746,366 B2 * | 6/2010 | Motoyama | 347/111 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |

(Continued)

*Primary Examiner* — Hussein A Elchanti

(57) ABSTRACT

A powertrain system includes a hybrid transmission coupled to an engine and an auxiliary hydraulic pump. The auxiliary hydraulic pump is commanded to operate at a predetermined speed only when enable criteria are met. An engine-off state is inhibited based upon a difference between a commanded speed and a monitored operating speed of the auxiliary hydraulic pump.

13 Claims, 5 Drawing Sheets

U.S. PATENT DOCUMENTS

| | | |
|---|---|---|
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |

| | | | | | | |
|---|---|---|---|---|---|---|
| 2009/0118934 A1 | 5/2009 | Heap | | 2009/0118948 A1 | 5/2009 | Heap |
| 2009/0118935 A1 | 5/2009 | Heap | | 2009/0118949 A1 | 5/2009 | Heap |
| 2009/0118936 A1 | 5/2009 | Heap | | 2009/0118950 A1 | 5/2009 | Heap |
| 2009/0118937 A1 | 5/2009 | Heap | | 2009/0118951 A1 | 5/2009 | Heap |
| 2009/0118938 A1 | 5/2009 | Heap | | 2009/0118952 A1 | 5/2009 | Heap |
| 2009/0118939 A1 | 5/2009 | Heap | | 2009/0118957 A1 | 5/2009 | Heap |
| 2009/0118940 A1 | 5/2009 | Heap | | 2009/0118962 A1 | 5/2009 | Heap |
| 2009/0118941 A1 | 5/2009 | Heap | | 2009/0118963 A1 | 5/2009 | Heap |
| 2009/0118942 A1 | 5/2009 | Hsieh | | 2009/0118964 A1 | 5/2009 | Snyder |
| 2009/0118943 A1 | 5/2009 | Heap | | 2009/0118969 A1 | 5/2009 | Heap |
| 2009/0118944 A1 | 5/2009 | Heap | | 2009/0118971 A1 | 5/2009 | Heap |
| 2009/0118945 A1 | 5/2009 | Heap | | 2009/0118999 A1 | 5/2009 | Heap |
| 2009/0118946 A1 | 5/2009 | Heap | | 2009/0144002 A1 | 6/2009 | Zettel |
| 2009/0118947 A1 | 5/2009 | Heap | | | | |

* cited by examiner

US 8,068,966 B2

METHOD FOR MONITORING AN AUXILIARY PUMP FOR A HYBRID POWERTRAIN

CROSS REFERENCE TO RELATED APPLICATIONS

This application claims the benefit of U.S. Provisional Application No. 60/985,219 filed on Nov. 3, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures include torque-generative devices, including internal combustion engines and electric machines, which transfer torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transferring tractive torque thereto. Electric machines, operative as motors or generators, generate a torque input to the transmission, independently of a torque input from the internal combustion engine. The electric machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes a hybrid transmission coupled to an engine and an auxiliary hydraulic pump. A method for controlling the powertrain system includes monitoring enable criteria. The auxiliary hydraulic pump is commanded to operate at a predetermined speed only when all the enable criteria are met. An operating speed of the auxiliary hydraulic pump is monitored, and the commanded speed and the monitored operating speed of the auxiliary hydraulic pump are compared. An engine-off state is inhibited based upon a difference between the commanded speed and the monitored operating speed of the auxiliary hydraulic pump.

BRIEF DESCRIPTION OF THE DRAWINGS

One or more embodiments will now be described, by way of example, with reference to the accompanying drawings, in which.

DETAILED DESCRIPTION

Figure 1:
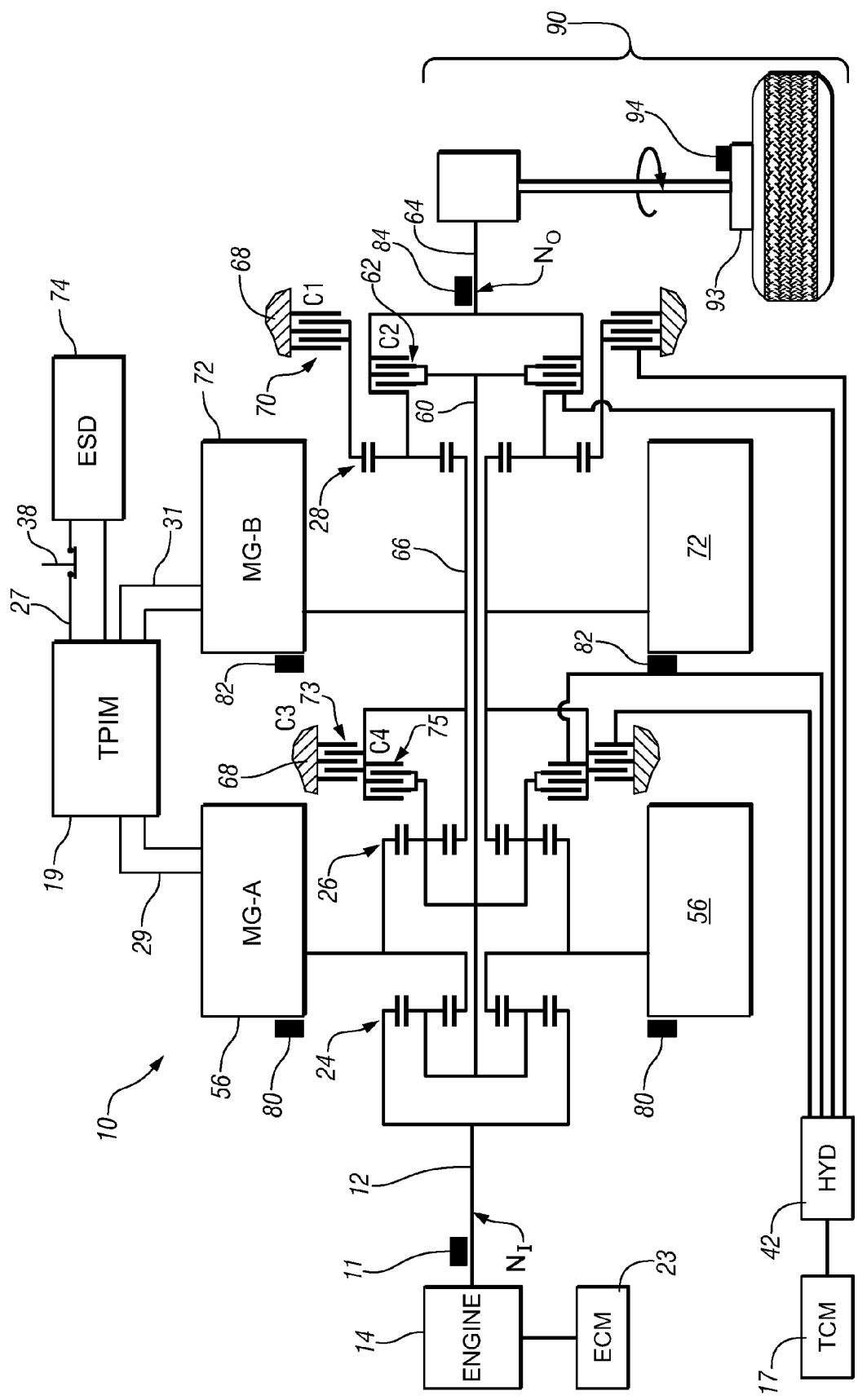
FIG. 1 is a schematic diagram of an exemplary hybrid powertrain, in accordance with the present disclosure.
Figure 2:
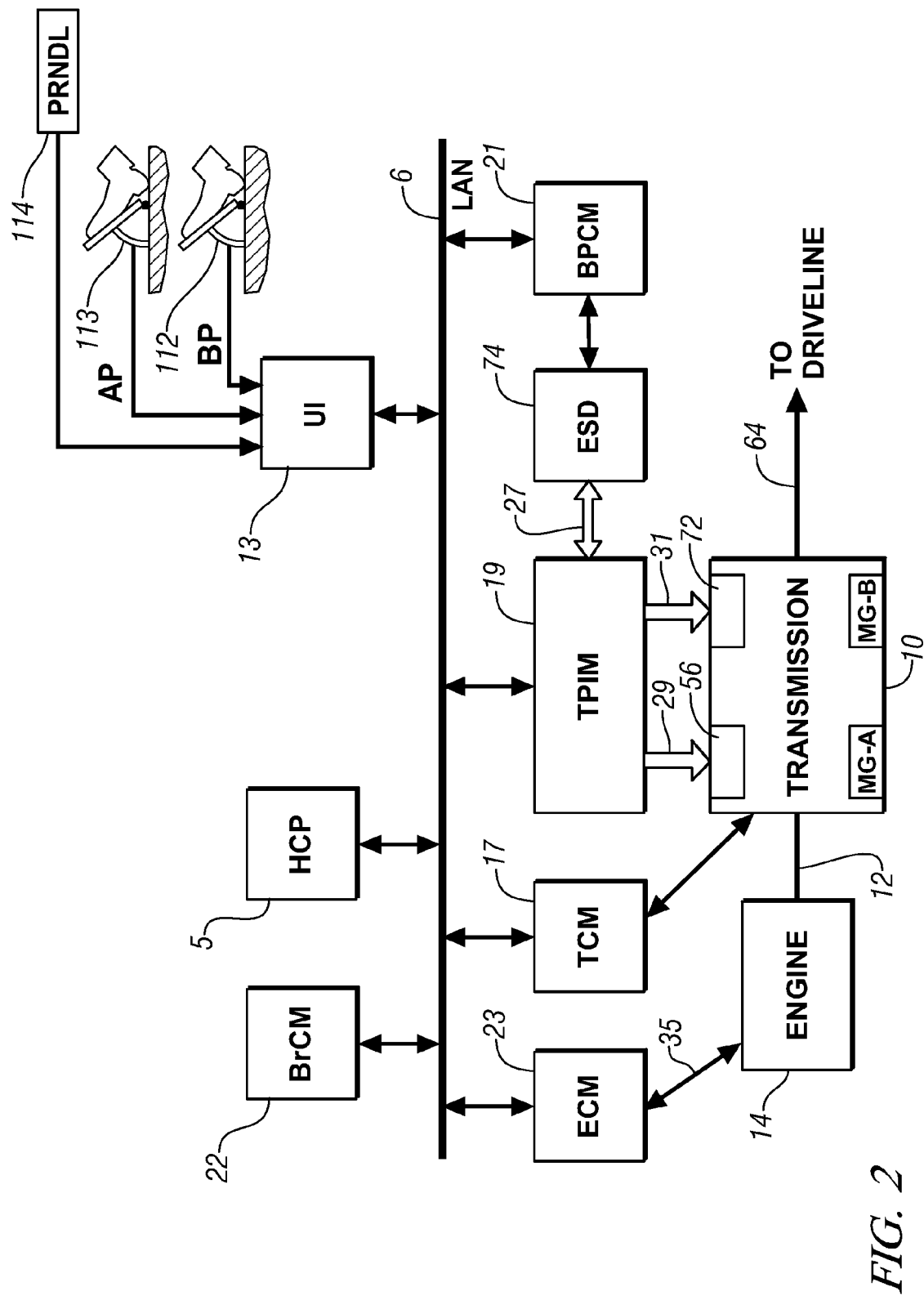
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72. The engine 14 and the torque machines comprising the first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
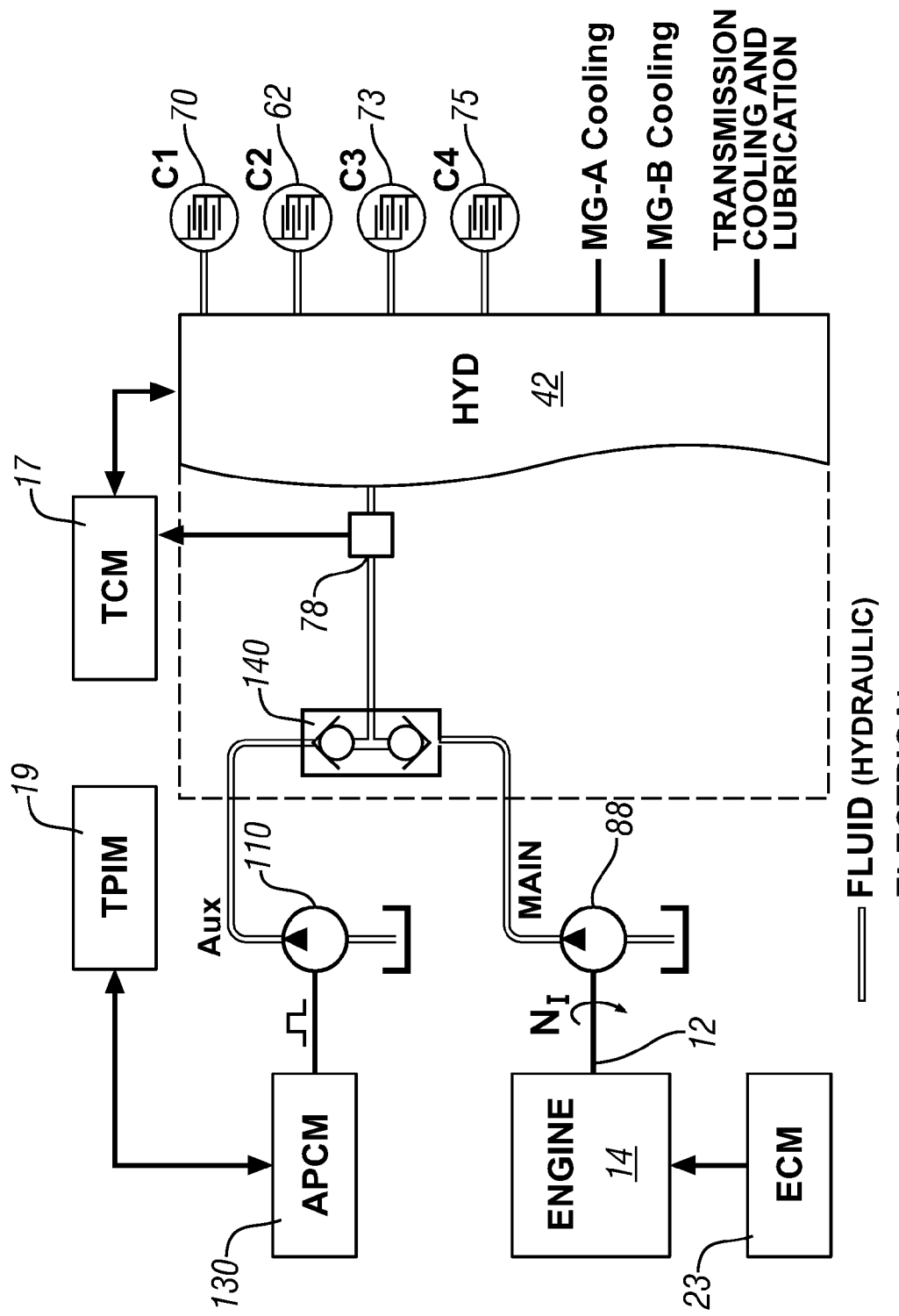
FIG. 3 is a more detailed schematic diagram of a hydraulic circuit, in accordance with the present disclosure.

FIG. 3 shows a more detailed schematic diagram of the hydraulic control circuit 42 for controlling flow of hydraulic fluid in the exemplary transmission described with reference to FIGS. 1 and 2. A main hydraulic pump 88 is driven off the input shaft 12 from the engine 14, and an auxiliary pump 110 is controlled by the TPIM 19 to provide pressurized fluid to the hydraulic control circuit 42 through a control valve 140. The auxiliary pump 110 preferably comprises an electrically-powered pump of an appropriate size and capacity to provide sufficient flow of pressurized hydraulic fluid into the hydraulic control circuit 42 to facilitate application of one or more of the torque transfer clutches when operational. The TPIM 19 preferably generates an output to an auxiliary pump control module ('APCM') 130 comprising a pulse-width-modulated (hereafter 'PWM') signal with frequency correlatable to desired auxiliary pump speed. The APCM 130 generates an output signal communicated to the TPIM 19 that preferably comprises a pulse-width-modulated signal having a frequency correlatable to monitored auxiliary pump speed and a duty cycle that varies from a low value to high value depending upon predetermined fault signals.

During operation, the auxiliary pump 110 receives the signal from the TPIM 19 and operates at a rotational speed corresponding to the commanded PWM duty cycle to pump hydraulic fluid drawn into the hydraulic control circuit 42 which flows to the control valve 140. The control valve 140 is preferably operative to control flow of hydraulic fluid from the auxiliary pump 110 and the main pump 88 by permitting flow of pressurized fluid into the hydraulic control circuit 42. The hydraulic control circuit 42 selectively distributes hydraulic pressure to a plurality of devices, including the torque-transfer clutches C1 70, C2 62, C3 73, and C4 75, active cooling circuits ('MG-A Cooling', 'MG-B Cooling') for the first and second electric machines 56 and 72, and a base cooling circuit ('Transmission Cooling and Lubrication') for cooling and lubricating elements of the transmission 10. Flow of hydraulic fluid to each of the aforementioned devices and circuits is effected through actuation of fluid control valves of the hydraulic control circuit 42 as controlled by the TCM 17.

In one embodiment, a pressure monitoring device 78 is operative to monitor main pressure in the hydraulic control circuit 42. The pressure monitoring device 78 is signally connected to the TCM 17. The pressure monitoring device 78 generates a signal output to the TCM 17 correlatable to a magnitude of pressure in the hydraulic control circuit 42. The pressure in the hydraulic control circuit 42 is correlatable to rotational speed of the auxiliary pump 110 adjusted for hydraulic fluid temperature. Alternatively the pressure monitoring device 78 can comprise a pressure switch device having a discrete output comprising either of a digital '1' or '0', depending upon whether the applied pressure is greater than or less than a predetermined threshold pressure. The threshold pressure can be correlated to the pump speed. Thus, the PWM duty cycle and the commanded rotational speed of the auxiliary pump 110 can be incrementally increased, and the TCM 17 can determine the PWM duty cycle that corresponds to the output of the pressure switch device switching from the digital '0' to the digital '1'.

A control scheme for executing a strategy to monitor and diagnose faults in the auxiliary pump 110 is preferably executed as one or more algorithms in the HCP 5, TCM 17, and/or TPIM 19. The control scheme comprises executing a diagnostic routine 425 and hydraulic fluid temperature tests when enable criteria are met (400). The control scheme determines whether the auxiliary pump 110 is available or unavailable based upon the enable criteria (400), the diagnostic routine (425) and the hydraulic fluid temperature tests. When the diagnostic routine 425 or the hydraulic fluid temperature tests determine that the auxiliary pump 110 is unavailable the control scheme inhibits operation in the engine-off state, thus causing the control system to operate the engine 14 in the engine-on state.

The enable criteria for the control scheme includes determining whether the auxiliary pump 110 is enabled ('Aux_Pump_Enabled'), determining whether the hydraulic fluid temperature ('Temp_Hyd_Fluid') is within a predetermined allowable temperature range, determining whether the engine in an engine-off state ('Engine_Off'), determining whether the auxiliary pump 110 is available ('Aux_Pump_Available'), and determining whether the powertrain is in a key-on state ('Key_ON'). Preferably all the aforementioned enable criteria are met or achieved prior to enabling operation of the auxiliary pump 110 and the diagnostic routine 425. The control scheme determines that the auxiliary pump 110 is enabled when the auxiliary pump 110 has been commanded by one of the control modules, e.g., the TPIM 19, to operate. With regard to the hydraulic fluid temperature criterion, the control scheme determines whether the hydraulic fluid temperature is within a range of operating temperatures between a maximum predetermined temperature value and a minimum predetermined temperature value. If the hydraulic fluid temperature is within the predetermined allowable temperature range, the enable criterion is met. Alternatively, the hydraulic fluid temperature criterion may be determined based upon a hydraulic fluid temperature test described hereinbelow with reference to FIG. 6. The engine-off enable criterion is met when the engine 14 has been commanded to the engine-off state by the control system. The auxiliary pump 110 is presumed available and the associated criterion is defaulted to available until the diagnostic routines 425 and/or the hydraulic fluid temperature tests return an unavailable state. The key-on criterion is met when the powertrain is in a key-on operating state. When all the enable criteria are met, the control scheme initiates the diagnostic routine 425. The hydraulic fluid temperature test ongoingly executes during a key-on event.

Figure 4:
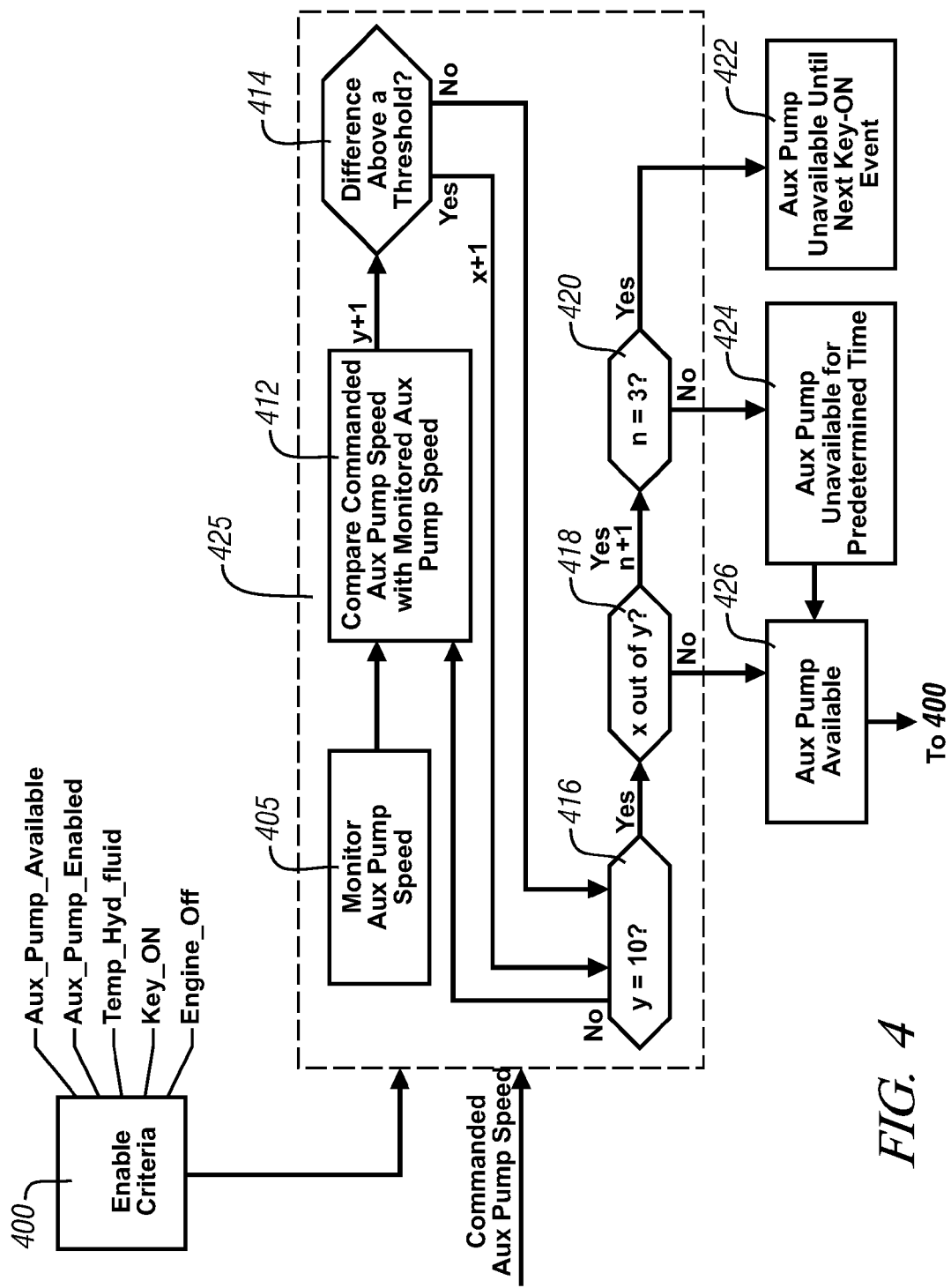
FIG. 4 is a flow chart of a diagnostic routine, in accordance with the present disclosure.

FIG. 4 shows the diagnostic routine 425. The diagnostic routine 425 includes monitoring the auxiliary pump speed (405). The monitored auxiliary pump speed is compared with a commanded auxiliary pump speed (412) and a speed performance fault is detected when a pump speed difference between the auxiliary pump speed and a commanded auxiliary pump speed exceeds a threshold (414). The commanded auxiliary pump speed is preferably commanded from the TPIM 19. As one skilled in the art appreciates, auxiliary pump speed may be monitored by sensors included on the auxiliary pump 110 or APCM 130, as described herein. Alternatively, the auxiliary pump speed is determined based upon hydraulic pressure as described hereinabove.

When an auxiliary pump fault occurs, the control scheme inhibits powertrain operation in the engine-off mode, thus causing the HCP 5 to command the powertrain system to crank and run the engine 14 and operate the powertrain with the engine 14 on (422, 424). Subsequent to determinations of an auxiliary pump fault, the engine 14 is in the engine-on state and the control scheme waits a predetermined elapsed time before indicating that the auxiliary pump 110 is available. Additionally, the control scheme may determine that the auxiliary pump 110 is unavailable until a next powertrain key-on event (422). For example, when a predetermined number of auxiliary pump faults occur during a powertrain key-on cycle the control scheme can indicate that the auxiliary pump 110 is unavailable until a next key-on event.

The diagnostic routine 425 conducts sets, preferably continuously, of auxiliary pump speed fault tests comprising a predetermined number of speed fault tests, e.g., ten speed fault tests. The diagnostic routine 425 determines that an auxiliary pump fault has occurred when a predetermined number of speed performance faults have occurred out of the set of speed fault tests using a fault maturation algorithm. A fault maturation algorithm can comprise, e.g., an X of Y routine (418) wherein a matured fault is detected when X faults are observed out of immediately preceding Y observations of the signal. An example is detecting a matured fault when faults are observed in eight of the immediately ten preceding observations.

The exemplary diagnostic routine 425 accommodates three auxiliary pump faults ('n=3') before determining that the auxiliary pump 110 is unavailable until the next key-on event (420). Each auxiliary pump fault causes a counter n to increment. When the counter n achieves three, i.e., n=3 ,the control scheme indicates that the auxiliary pump 110 is unavailable and indicates the auxiliary pump 110 is unavailable until the next key-on event (422). When the counter n is less than three, the control scheme indicates that the auxiliary pump 110 is unavailable for a predetermined period of time and subsequent indicates the auxiliary pump 110 is available after the predetermined period of time (424). This availability of the auxiliary pump 110 in one of the criterion of the enable criteria (400).

Figure 5:
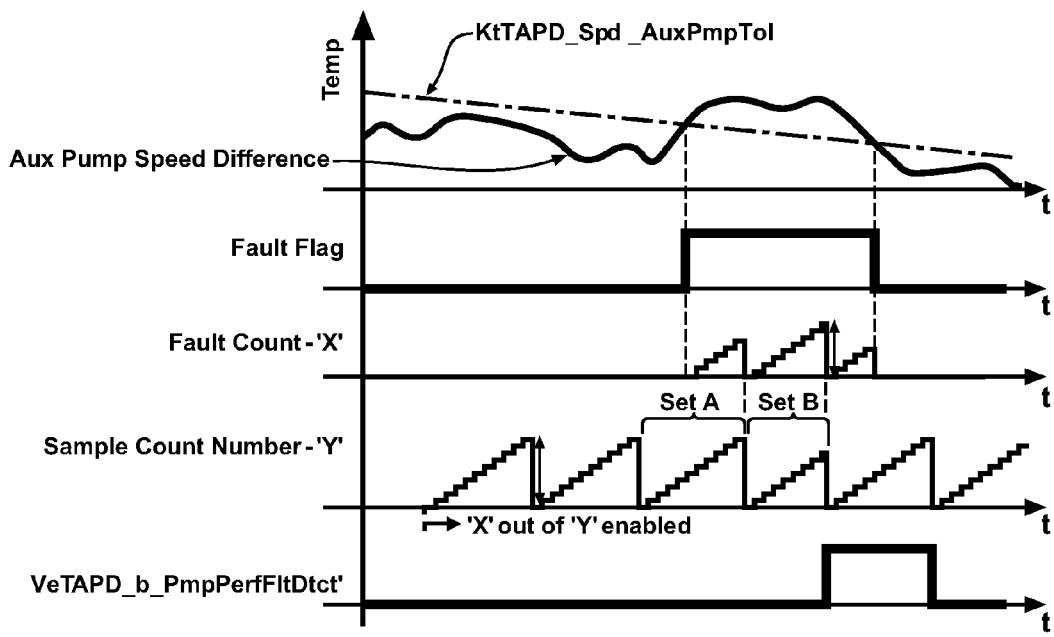
FIG. 5 is a data graph, in accordance with the present disclosure.

FIG. 5 is a datagraph showing results of an exemplary diagnostic routine 425 during powertrain operations. During the monitoring of the auxiliary pump speed (405) the diagnostic routine 425 compares the monitored auxiliary pump speed ('Actual speed') with the desired auxiliary pump speed ('Desired speed') to determine an auxiliary pump speed difference between the desired auxiliary pump and the monitored auxiliary pump speed (412). As FIG. 5 shows, the auxiliary pump speed difference ('Aux Pump Speed Difference') between the desired auxiliary pump and the monitored auxiliary pump speed is compared with a threshold difference ('KtTAPD_Spd_AuxPmpTol'). The threshold difference may be determined based upon hydraulic fluid temperature, wherein the diagnostic routine 425 determines the hydraulic fluid temperature and locates a corresponding threshold difference in a predetermined lookup table. When the auxiliary pump speed difference is above the threshold difference, the diagnostic routine 425 determines that a speed performance fault has occurred and sets a fault flag ('Fault Flag') and increments a fault count ('Fault Count'). The fault count is reset to zero when a sample count ('Sample Count') i.e., a set of speed fault tests, increment to a predetermined amount, e.g., 10 as shown the exemplary diagnostic routine 425 in block 416 in FIG. 4.

FIG. 5 shows sample sets of auxiliary pump speed fault tests ('Sample Count Number-'Y''). Performance faults are monitored when the fault flag ('Fault Flag') indicating a speed fault is set. Performance faults can occur in the middle of a set ('Set A') of speed fault tests thereby not achieving the predetermined number of speed performance faults in a set of speed fault tests to determine that an auxiliary pump fault has occurred. As shown, a next set of speed fault tests ('Set B') has enough performance faults to determine that an auxiliary pump fault has occurred thus, the diagnostic routine 425 enables an auxiliary pump fault flag ('VeTAPD_b_PmpPerfFltDtct') to indicate an auxiliary pump fault.

Figure 6:
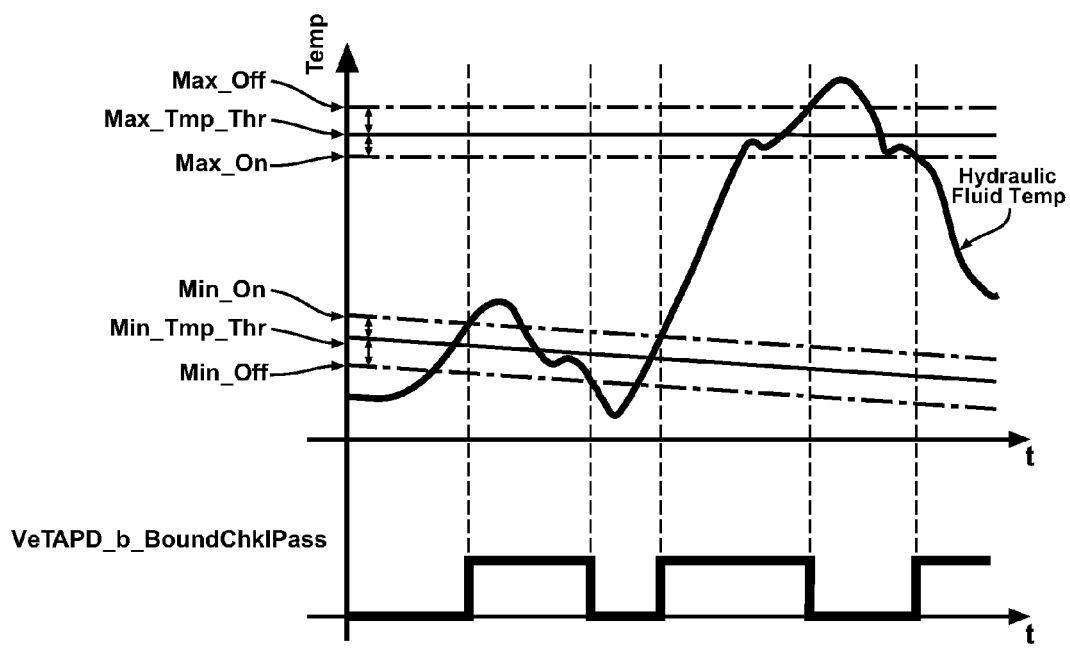
FIG. 6 is a data graph illustrating a hydraulic fluid temperature test, in accordance with the present disclosure.

FIG. 6 graphically illustrates hydraulic fluid temperature over time including a plurality of thresholds for the hydraulic fluid temperature test. The hydraulic fluid temperature test comprises monitoring hydraulic fluid temperature, determining if hydraulic fluid temperature is within an allowable temperature range, and determining if the auxiliary pump 110 is available. The allowable temperature range comprises a maximum hydraulic fluid temperature threshold ('Max_Tmp_Thr') and a minimum hydraulic fluid temperature threshold ('Min_Tmp_Thr'). Both the maximum and minimum hydraulic fluid temperature thresholds include an off and on threshold to allow hysteresis.

During key-on starts, the auxiliary pump 110 is enabled after the hydraulic fluid temperature exceeds the ON threshold of the minimum hydraulic fluid temperature threshold ('Min_On'), i.e., a first minimum temperature threshold. After the hydraulic fluid temperature exceeds the ON threshold of the minimum hydraulic fluid temperature threshold, hydraulic fluid temperature test can determine that the auxiliary pump 110 is unavailable after the hydraulic fluid temperature decreases below the OFF threshold of the minimum hydraulic fluid temperature threshold ('Min_Off'), i.e., a second minimum temperature threshold. The hydraulic fluid temperature test determines that the auxiliary pump 110 is unavailable when the hydraulic fluid temperature exceeds the OFF threshold of the maximum hydraulic fluid temperature threshold ('Max_Off'), i.e., a first maximum temperature threshold. The hydraulic fluid temperature test determines that the auxiliary pump 110 is available after exceeding the maximum hydraulic fluid temperature threshold when the hydraulic fluid temperature decreases below the ON threshold of the maximum hydraulic fluid temperature threshold ('Max_On'), i.e., a second maximum temperature threshold. Hysteresis is included between the ON and OFF thresholds of the minimum hydraulic fluid temperature thresholds and between the ON and OFF thresholds of the maximum hydraulic fluid temperature thresholds to permit operation and minimize on-off cycling of the auxiliary pump 110. As FIG. 6 shows, a signal indicating that the hydraulic fluid temperature test has determined that the hydraulic fluid temperature is within an operating range may be outputted ('VeTAPD_b_BoundChkPass'), and can be input to the diagnostic routine 425 as the enable criterion that indicates the hydraulic fluid temperature ('Temp_Hyd_Fluid') is within the predetermined allowable temperature range (400).

The first minimum temperature threshold and the second minimum temperature threshold preferably exceed and precede a predetermined temperature magnitude from the minimum hydraulic fluid temperature threshold. The first maximum temperature threshold and the second maximum temperature threshold preferably exceed and precede a predetermined temperature magnitude from the maximum hydraulic fluid temperature threshold. The maximum and minimum hydraulic fluid temperature thresholds may be fixed predetermined temperatures or may be determined based upon predetermined stored temperatures in a lookup table corresponding to ambient temperatures. Thus, the hydraulic fluid temperature test can be used to enable and disable operation of the auxiliary pump 110, and can be used to enable and disable operation of the diagnostic routine 425.

It is understood that modifications are allowable within the scope of the disclosure, including other systems employing both a main and an electrically-actuated auxiliary hydraulic fluid pump to supply pressurized fluid to a hydraulic circuit for a transmission device operably connected to an internal combustion engine of a vehicle. For example, hybrid vehicle systems employing a belt-alternator-starter system which is operative to selectively turn off the internal combustion engine during ongoing operation of the vehicle. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for monitoring a powertrain system including a hybrid transmission coupled to an engine selectively operative in engine-on and engine-off states during ongoing operation of the powertrain system and including an auxiliary hydraulic pump selectively operative to pump hydraulic fluid in a hydraulic circuit of the hybrid transmission, the method comprising:
    monitoring a plurality of enable criteria;
    commanding the auxiliary hydraulic pump to operate at a predetermined speed only when all the enable criteria are met;
    monitoring an operating speed of the auxiliary hydraulic pump;
    comparing the commanded speed and the monitored operating speed of the auxiliary hydraulic pump; and
    inhibiting the engine-off state based upon a difference between the commanded speed and the monitored operating speed of the auxiliary hydraulic pump.

2. The method of claim 1, wherein the enable criteria comprise the engine in an engine-off state, the powertrain system in a key-on state, the auxiliary hydraulic pump in an enabled state, the auxiliary hydraulic pump in an available state, and a temperature of the hydraulic fluid within a predetermined range.

3. The method of claim 2, wherein the enable criteria comprising the temperature of the hydraulic fluid within a predetermined range includes a minimum temperature threshold and a maximum temperature threshold.

4. The method of claim 3, wherein the minimum temperature threshold and the maximum temperature threshold each include temperature hysteresis.

5. The method of claim 1, comprising inhibiting the engine-off state when the difference between the commanded speed and the monitored operating speed of the auxiliary hydraulic pump exceeds a predetermined threshold.

6. The method of claim 5, further comprising identifying a speed performance fault when the difference between the commanded speed and the monitored operating speed of the auxiliary hydraulic pump exceeds the predetermined threshold.

7. The method of claim 6, monitoring the speed performance faults, and detecting an auxiliary pump fault when a predetermined number of speed performance faults have occurred.

8. The method of claim 7, further comprising inhibiting engine operation in the engine-off state when an auxiliary pump fault has been detected.

9. The method of claim 1, further comprising permitting the engine-off state after a predetermined elapsed time subsequent to inhibiting the engine-off state.

10. The method of claim 9, further comprising inhibiting the engine-off state until a key-on event after a predetermined number of cycles of permitting and inhibiting the engine-off state.

11. A method for monitoring a powertrain system including a hybrid transmission connected to an engine selectively operative in engine-on and engine-off states during ongoing operation of the powertrain system and including an auxiliary hydraulic pump selectively operative to pump hydraulic fluid in the hybrid transmission, the method comprising:
    monitoring the engine state;
    commanding the auxiliary hydraulic pump to operate at a predetermined speed when the engine is operated at the engine-off state;
    monitoring hydraulic pressure in the hybrid transmission;
    determining an operating speed of the auxiliary hydraulic pump based upon the monitored hydraulic pressure;
    comparing the commanded speed and the determined operating speed of the auxiliary hydraulic pump; and
    inhibiting the engine-off state when the a difference between the commanded speed and the determined operating speed of the auxiliary hydraulic pump exceeds a predetermined threshold.

12. The method of claim 11, comprising determining the predetermined threshold based upon a temperature of the hydraulic fluid.

13. The method of claim 11, further comprising permitting the engine-off state after an elapsed time period.

* * * * *